United States Patent [19]

Spijkerman et al.

[11] Patent Number: 5,594,615
[45] Date of Patent: Jan. 14, 1997

[54] METHOD AND APPARATUS FOR REDUCING THE INTENSITY OF MAGENETIC FIELD EMISSIONS FROM DISPLAY DEVICE

[75] Inventors: Johannes Spijkerman, Arlington; Hubert F. Flamant, Dallas, both of Tex.

[73] Assignee: MTI, Inc., Dallas, Tex.

[21] Appl. No.: 572,686

[22] Filed: Dec. 14, 1995

Related U.S. Application Data

[63] Continuation of Ser. No. 60,274, May 10, 1993, abandoned.
[51] Int. Cl.$^6$ ............................................. H01J 1/52
[52] U.S. Cl. .............................. 361/150; 307/91; 315/8
[58] Field of Search ..................... 361/149, 150, 361/143, 146, 151, 159, 267; 307/104, 89–91; 174/35 R, 35 MS, 35 TS, 36, 35 GC; 315/8, 85; 313/478, 479, 106, 107, 313; 348/818–820, 835

[56] References Cited

U.S. PATENT DOCUMENTS

| | | |
|---|---|---|
| 2,877,286 | 3/1959 | Vance et al. . |
| 2,994,803 | 8/1961 | Goldberg . |
| 3,322,998 | 5/1967 | Norley . |
| 3,340,443 | 9/1967 | Rieth et al. . |
| 3,399,325 | 8/1968 | Teoder et al. . |
| 3,466,499 | 9/1969 | Beth . |
| 3,735,193 | 5/1973 | Ikeuchi . |
| 3,831,154 | 8/1974 | Epstein et al. . |
| 3,837,911 | 9/1974 | Bobeck et al. . |
| 3,879,633 | 4/1975 | Stark, Jr. . |
| 3,887,833 | 6/1975 | Yamazaki . |
| 3,947,632 | 3/1976 | Giger et al. . |
| 4,020,475 | 3/1977 | Lotgering et al. . |

(List continued on next page.)

FOREIGN PATENT DOCUMENTS

| | | |
|---|---|---|
| 0220777A1 | 10/1986 | European Pat. Off. . |
| 0523741A1 | 7/1992 | European Pat. Off. . |
| 0547856A1 | 12/1992 | European Pat. Off. . |
| 2809725 | 9/1979 | Germany ................................ 315/8 |
| 55-92263 | of 1980 | Japan . |
| 59-197198 | 11/1984 | Japan . |
| 62-82633 | 6/1987 | Japan . |

OTHER PUBLICATIONS

IBM Technical Disclosure Bulletin, Programmable Very Low Frequency Magnetic Compensation For Displays, pp. 440–441, vol. 32, No. 2, Jul. 1989.

*User's Handbook for Evaluating Visual Display Units*, Swedac, MPR 1990:10 1990–12–31.

*Test Methods for Visual Display Units*, MPR 1990:8 1990–12–01.

Primary Examiner—Fritz Fleming
Attorney, Agent, or Firm—Haynes and Boone, L.L.P.; Jeffrey M. Becker

[57] ABSTRACT

Method and apparatus for the reduction of the intensity of magnetic field emissions from display devices and other magnetic field emitters comprising an active magnetic field bucking system and a passive magnetic shield, for use either singularly or in combination. Various circuits are disclosed for generating a bucking current necessary to buck the emitted magnetic field. The magnetic shield comprises a material selected from the group consisting of manganese or aluminum doped yttrium aluminum or yttrium iron garnet, iron doped glass, iron based thin films, ferrous fluoride, ferrous borate, and combinations thereof.

24 Claims, 2 Drawing Sheets

U.S. PATENT DOCUMENTS

| | | |
|---|---|---|
| 4,380,716 | 4/1983 | Romeo et al. . |
| 4,634,930 | 1/1987 | Toshiyasu et al. . |
| 4,636,911 | 1/1987 | Truskalo . |
| 4,661,856 | 4/1987 | Schnack . |
| 4,709,220 | 11/1987 | Sakane et al. . |
| 4,826,718 | 5/1989 | Unsworth et al. . |
| 4,845,402 | 7/1989 | Smith ................................ 313/422 |
| 4,871,220 | 10/1989 | Kohin . |
| 4,874,903 | 10/1989 | Clarke ............................. 174/35 MS |
| 4,899,082 | 2/1990 | Sands et al. . |
| 4,914,350 | 4/1990 | Bosch et al. ........................ 315/8 |
| 4,922,153 | 5/1990 | Kevius ................................. 315/8 |
| 4,922,167 | 5/1990 | Sluyterman et al. . |
| 4,947,083 | 8/1990 | Bosch et al. ........................ 315/8 |
| 4,950,955 | 8/1990 | Hoover et al. . |
| 4,963,789 | 10/1990 | Buhler . |
| 4,996,461 | 2/1991 | Bentley . |
| 5,017,832 | 5/1991 | Takita . |
| 5,066,891 | 11/1991 | Harrold et al. . |
| 5,101,139 | 3/1992 | Lechter . |
| 5,107,179 | 4/1992 | Vidovich . |
| 5,122,619 | 6/1992 | Dlubak . |
| 5,151,635 | 9/1992 | Cappels ............................. 315/370 |
| 5,198,729 | 3/1993 | Powell . |
| 5,218,268 | 6/1993 | Matsuda et al. ................... 313/478 |
| 5,235,243 | 8/1993 | Tong . |
| 5,260,626 | 11/1993 | Takase et al. ....................... 315/85 |
| 5,291,097 | 3/1994 | Kawamura et al. ............... 313/478 |
| 5,311,099 | 5/1994 | Grocki ................................. 315/8 |
| 5,317,239 | 5/1994 | Ohguro et al. ..................... 315/370 |
| 5,350,973 | 9/1994 | Yokota et al. . |
| 5,379,117 | 1/1995 | Yang ................................. 358/400 |
| 5,485,056 | 1/1996 | Sasaki et al. ......................... 315/8 |

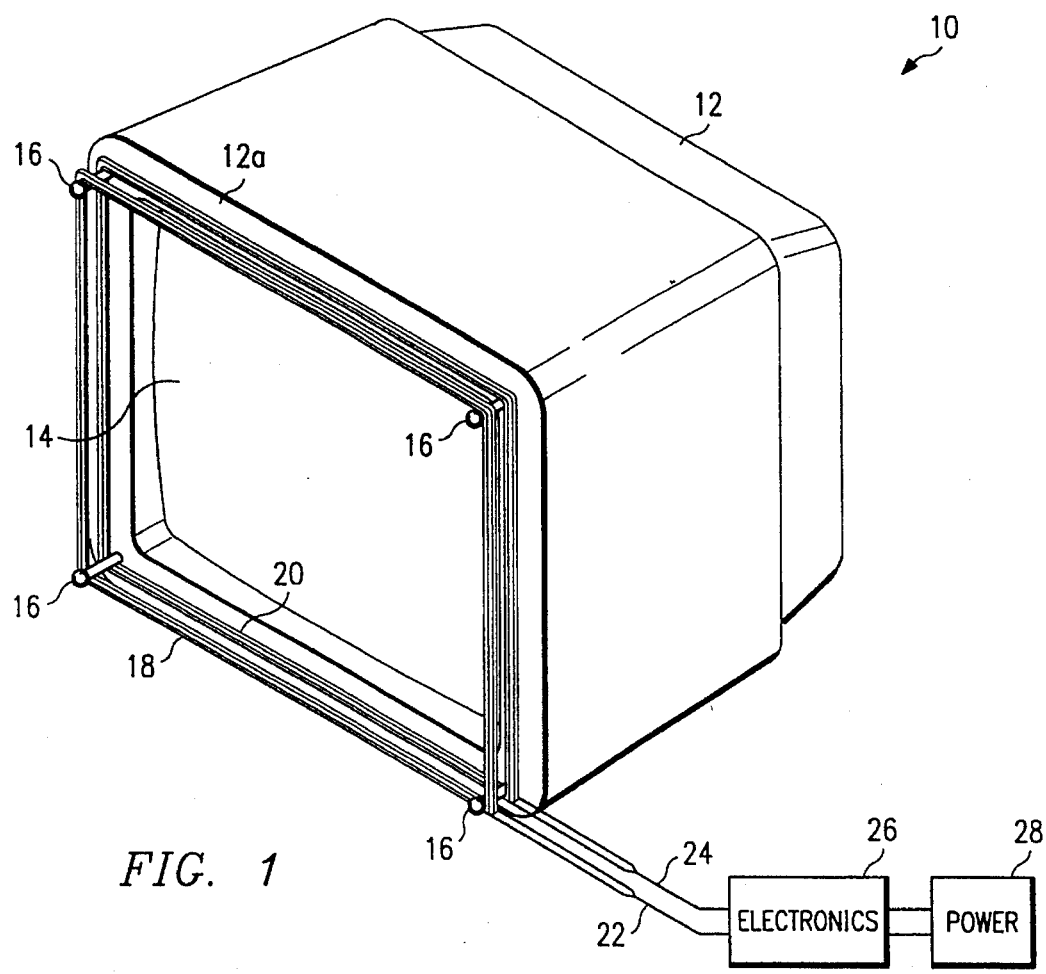
FIG. 1
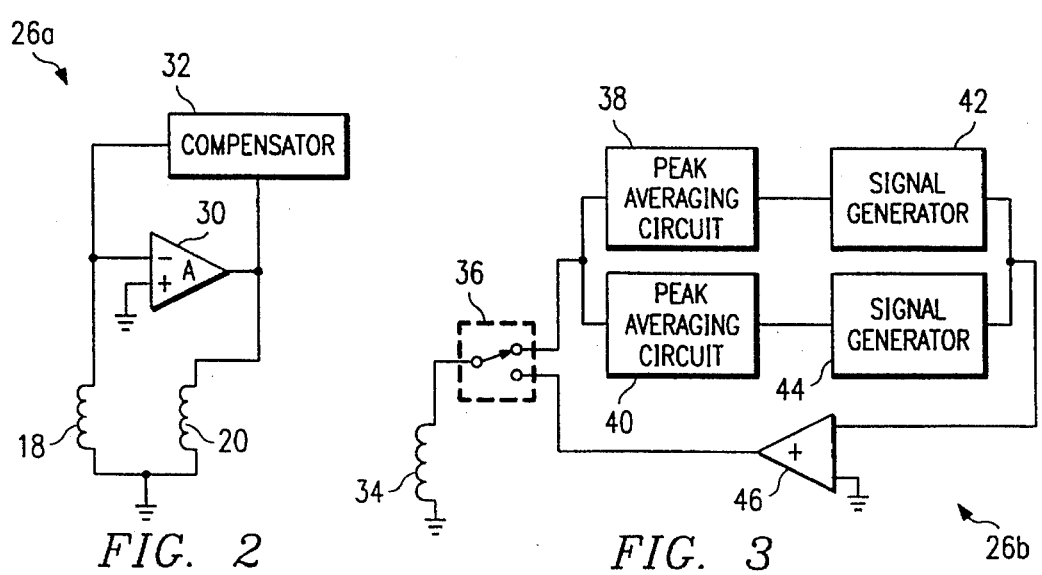
FIG. 2
FIG. 3

METHOD AND APPARATUS FOR REDUCING THE INTENSITY OF MAGENETIC FIELD EMISSIONS FROM DISPLAY DEVICE

FIELD OF THE INVENTION

This is a continuation of Ser. No. 08/060,274 filed May 10, 1993, now abandoned.

The present invention relates to methods and apparatus for reducing the intensity of the magnetic field emitted from various magnetic field emitting devices, such as engines, especially jet engines, electric rail cars, microwave ovens and other electrical appliances, and electric display devices, including CRT's, LCD's, LED's and gas discharge displays. More particularly, the present invention relates to active magnetic field cancellation circuits and passive magnetic screens disposed about such magnetic field emitting devices, and specifically disposed about a display device to reduce the magnetic field emitted therefrom.

BACKGROUND OF THE INVENTION

Display devices such as CRT's, LCD's, LED's and gas discharge displays use electron beams, electrostatic fields and/or magnetic fields for the purpose of displaying graphic images, information and data. Such display devices operate on static and dynamic electrical fields, i.e. electrical voltages and currents, which as a by-product emit time-varying magnetic fields. Such magnetic fields create harmful biological effects in humans, and interfere with radio transmissions and other devices in the vicinity of the display devices which employ electromagnetic waves.

Since the strength of a magnetic field decreases with distance, it has been suggested that the harmful biological effects of the magnetic field emitted from display devices can be avoided by maintaining an adequate, safe distance from such devices, such as one meter. Also, since the harmful effects of magnetic fields increase with exposure, it has been suggested that the harmful effects can be reduced by turning off the display devices when not in use.

Unfortunately, many display devices must be in use for substantial lengths of time making it unfeasible to reduce emissions by turning off the device. Further, due to the small character size displayed on most of such devices, it is impractical to maintain an adequate safe distance from the device.

In addition to the magnetic fields emitted from the display devices, there exist ambient magnetic fields produced by the earth and other electrical devices. These ambient magnetic fields can interfere with the proper operation of the above-mentioned display devices by altering the color display and shifting the raster beam.

Numerous techniques have been developed to block the introduction of external ambient magnetic fields into such display devices to prevent interference with their normal operation. However, such magnetic cancellation devices tend to increase the total magnetic field emitted from the display device, thereby increasing the interference with other devices in the vicinity and increasing the harmful biological effects caused by the magnetic field. For example, U.S. Pat. No. 5,066,891 to Harrold et al. discloses a magnetic field sensing and cancelling circuit for use with a CRT which comprises a closed loop system of flux gate sensors to measure external magnetic fields and magnetic field cancellation coils disposed around the perimeter of the face plate of the CRT to cancel the measured field and thus minimize color and positional image distortion. The cancellation coils, however, emit an outwardly directed magnetic field to cancel the measured field, thereby increasing the magnetic field directed at the user.

For the foregoing reasons, there is a need to develop an apparatus and method to reduce the intensity of the magnetic field emitted from display devices.

SUMMARY OF THE INVENTION

The methods and apparatus for reducing the intensity of the magnetic field emitted from display devices of the present invention avoid and overcome the above-mentioned disadvantages and drawbacks which are characteristic of the prior art.

According to the present invention and in a departure from the prior art, a wire coil is aligned with the screen of a display device such that the magnetic field emanating from the screen passes through the wire coil and induces an electric current therein. This current is passed through an electronic circuit, the output of which is a countercurrent which is passed through a wire coil to create a magnetic field to buck and cancel the magnetic field emanating from the screen of the display device.

In a preferred embodiment, the electric current induced in the wire coil by the magnetic field is passed through an operational amplifier which produces the countercurrent. This countercurrent is passed through a second wire coil disposed adjacent to the first coil to create the bucking magnetic field. A closed loop feedback system is used to impart the countercurrent with the appropriate characteristics to create the bucking magnetic field.

In another preferred embodiment of the present invention, the electric current induced in the wire coil by the magnetic field emanating from the display device is controlled by an electronic switch which operates between a sensing position and a bucking position. When in the sensing position, the current is passed through a parallel arrangement of peak averaging circuits to first measure the current, and then through an associated parallel arrangement of signal generators. The signal generators produce the appropriate countercurrent for creating the bucking magnetic field. When the electronic switch is in the bucking position, the wire coil no longer acts as a magnetic sensor and the countercurrent is passed through the wire coil to cancel the magnetic field emanating from the display device.

In a further preferred embodiment of the present invention, the electric current induced in the wire coil by the magnetic field emanating from the display device is passed to an electronic circuit which produces an opposing current to drive the voltage between the coil and the circuit to zero. By driving the voltage to zero, a countercurrent is produced flowing through the wire coil to buck the magnetic field emanating from the display device.

In addition to the active magnetic field cancellation apparatus, the present invention is also directed to the provision of passive means for reducing the magnetic field emanating from display devices. In a preferred embodiment, a display device is either retro-fitted with or manufactured to include a screen of material having a high magnetic permeability to absorb and deflect the magnetic field emanating from the display device.

BRIEF DESCRIPTION OF THE DRAWINGS

The present invention may be better understood, and its numerous objects, features and advantages will become apparent to those skilled in the art, by reference to the accompanying drawings in which:

FIG. 1 is a schematic view, partially in perspective, of a display device showing the assembly of the present invention installed thereon;

FIG. 2 is a block diagram of the magnetic field cancellation circuitry of the present invention;

FIG. 3 is a block diagram of the magnetic field cancellation circuitry of the present invention;

DESCRIPTION OF THE PREFERRED EMBODIMENT

Figure 4:
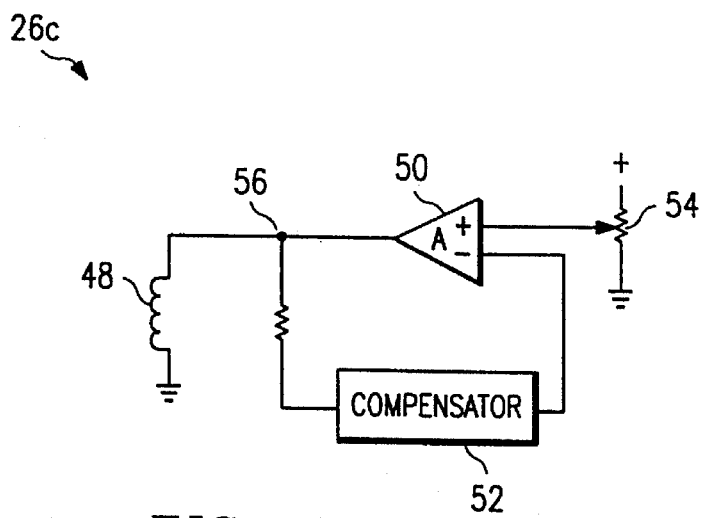
FIG. 4 is a block diagram of the magnetic field cancellation circuitry of the present invention.

Referring now to the drawings and particularly to FIG. 1, a display device 10 includes a housing 12 and a screen 14. The housing 12 contains devices for producing electron beams, electrostatic fields and/or magnetic fields which are used to display graphic images on the screen 14. Such beams and fields produce time-varying magnetic fields that pass through and emanate from the screen 14 in a generally perpendicular direction thereto. In the United States, the vast majority, if not all, of such magnetic fields will have frequencies of either 60 Hz or 15,000 Hz corresponding to the frequency of the power source for the display device 10 and the raster frequency of the beams, respectively.

The housing 12 includes a front bezel 12a enclosing the screen 14. Four knobs 16 are attached to the corners of the bezel 12a and extend outwardly from the housing 12. The knobs 16 receive wire coils for sensing and bucking the magnetic fields emanating from the screen 14. In a preferred embodiment, a magnetic field sensing coil 18 and a magnetic field bucking coil 20 are looped around the knobs 16. Those of ordinary skill in the art will recognize that the coils 18 and 20 may be comprised of a single center-tapped coil with the tap connected to ground (shown schematically in FIG. 2). Preferably, the sensing coil 18 has a greater number of loops of wire than the bucking coil 20 since greater sensitivity is required of the sensing coil 18 to eliminate the interference of noise. Further, this disparity reduces heat losses due to the need for the sensing coil 18, but not of the bucking coil 20, to produce a current generated voltage.

Connection wires 22 and 24 extend from the coils 18 and 20, respectively, for connecting the coils to electronic circuitry 26. The electronic circuitry 26 can take various forms which are described in detail below. The electronic circuitry 26 is powered by a source of electricity 28.

Referring now to FIG. 2, a preferred embodiment of the electronic circuitry 26 is shown in block diagram form and generally referred to by reference numeral 26a. The circuitry 26a includes the sensing coil 18 which generates a current proportional to the strength of the magnetic field passing through it. This current is communicated to a power operational amplifier 30 which produces an output current. This output, or bucking current is passed through the bucking coil 20, thereby creating a bucking magnetic field to cancel and negate the magnetic field sensed by the sensing coil 18.

A compensator network 32 acts as a closed loop feedback system to adjust the bucking current produced by the amplifier 30. The compensator 32 creates an appropriate bucking magnetic field to counteract the magnetic fields emanating from the screen 14. More particularly, the amplifier 30 and the associated compensator 32 provide gain to compensate for power losses (the resistance and parasitic capacitance losses) in the circuitry 26a to provide sufficient current to the bucking coil 20. Additional gain is also provided to take into account any difference in the number of loops of wire comprising the sensing and bucking coils 18 and 20, respectively, as described above.

Also, if the bucking coil 20 is not in reverse polarity with the sensing coil 18, the amplifier 30 and the compensator 32 include adjustments to shift the bucking current 180° out of phase from the current generated by the sensing coil 18, so that the bucking current is a countercurrent which will cancel the sensed magnetic field. These adjustments also take into account the phase shifts associated with parasitic capacitance losses, and further screen the current generated by the sensing coil 18 to limit the output of the amplifier 30 to frequencies of 60 Hz and 15,000 Hz, respectively. Those of ordinary skill in the art will recognize that to decrease the required precision of the amplifier 30, the amplifier 30 can be comprised of separate operational amplifiers corresponding to each frequency of the magnetic field, together with a summing amplifier.

Referring now to FIG. 3, another preferred embodiment of the electronic circuitry 26 is shown in block diagram form and is generally referred to by reference numeral 26b. The circuitry 26b includes a wire coil 34 controlled by means of an electronic switch 36, which allows the coil 34 to act as a sensing coil or a bucking coil. The switch 36 is controlled by a clock (not shown) and operates between a sensing position, shown in FIG. 3, and a bucking position. In operation, the switch 36 will be predominately in the bucking position, but will intermittently move to the sensing position to resample the magnetic field emanating from the screen 14.

When the switch 36 is in the sensing position, the magnetic field emanating from the screen 14 passing through the coil 34 generates a current proportional to the strength of the field. The current is communicated to peak averaging circuits 38 and 40 which rectify and filter the current to determine the amplitude of the 60 Hz and 15,000 Hz signals, respectively. The output from the peak averaging circuits 38 and 40 are communicated to signal generators 42 and 44, respectively, for generating 60 Hz and 15,000 Hz signals having the proper amplitude and phase shift to create the bucking magnetic field for cancelling the sensed magnetic field emanating from the screen 14. Those of ordinary skill in the art will recognize that the signal generators 42 and 44 include operational amplifiers and compensation networks similar to those described in connection with the circuitry 26a shown in FIG. 2 to create the proper gain and phase shift.

The output signals from the signal generators 42 and 44 are applied to a summing amplifier 46 to sum the 60 Hz and 15,000 Hz signals and then boost the summed signal to drive the coil 34 to produce the bucking magnetic field while the switch 36 is in the bucking position. It will be obvious to those skilled in the art that the circuitry 26b lends itself to be digitally formed in lieu of the analog circuit shown here.

Referring now to FIG. 4, a further preferred embodiment of the electronic circuitry 26 is shown in block diagram form and is generally referred to by reference numeral 26c. The circuitry 26c, like the circuitry 26b, includes a coil 48 which acts as a sensing coil and as a bucking coil.

The magnetic field emanating from the screen 14 passing through the coil 48 generates a current proportional to the strength of the field. The current is communicated through a node 56 to the output node of a power operational amplifier 50, which is regulated by a compensator network 52 which is similar to the compensator 32 described in connection with the embodiment shown in FIG. 2.

The compensator 52 acts as a closed loop feedback system to adjust the output produced by the amplifier 50 and to create an appropriate bucking magnetic field for counteracting the magnetic fields emanating from the screen 14. More particularly, the amplifier 50 and the associated compensator 52 provide gain to compensate for power losses (the resistance and parasitic capacitance losses) in the circuitry 26c so as to provide sufficient bucking current to the coil 48. In addition to gain, the amplifier 50 and the compensator 52 shift the output 180° out of phase from the current generated by the coil 48, so that the two currents create cancelling magnetic fields.

In operation, the coil 48 produces a current in the circuitry 26c proportional to the strength of the magnetic field emanating from the screen 14. This current produces a voltage at the node 56, and thus through the feedback loop containing the compensator 52, such that the amplifier 50 produces an output current to drive the voltage at the node 56 to zero. As the voltage drops to zero, the output current from the amplifier 50 passing through the coil 48 rises to the level of the current being induced by the coil 48. Since the compensator 52 insures that the two currents are 180° out of phase, the magnetic field passing through the coil 48 is cancelled by the countercurrent output from the amplifier 50.

The circuitry 26c further contains a DC voltage source 54 communicating with the input of the amplifier 50. The voltage source 54 is set to a predetermined voltage to counteract the DC voltage created by the inductance of the coil 48, such that the DC voltage at node 56 is also zero.

Figure 5:
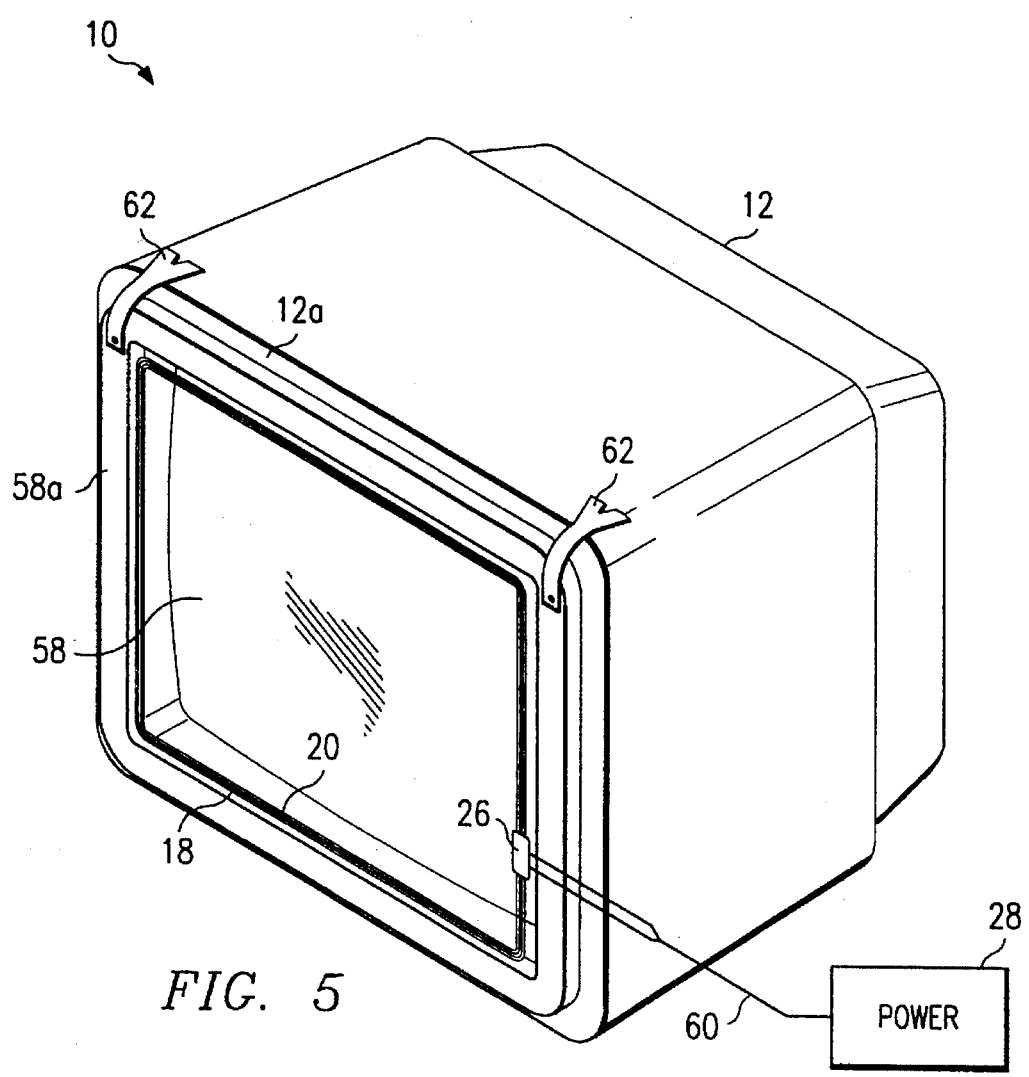
FIG. 5 is a view similar to FIG. 1 showing an alternate preferred embodiment of the present invention.

Referring now to FIG. 5, an alternate preferred embodiment of the apparatus of the present invention is shown, in which the coils 18 and 20, as well as the electronic circuitry 26, are formed on a transparent screen 58 having a border 58a by conventional techniques well known to those of ordinary skill in the art, such as silk screening, etching, imprinting or vacuum deposition. The coils 18 and 20 may alternatively be formed on the border 58a via the same conventional techniques just described rather than directly on the screen 58. Both the screen 58 and the border 58a are preferably formed of a plastic material, with the screen 58 being anti-glare in nature.

Connection wires 60 extend from the electronic circuitry 26 for connecting the circuitry to a source of power. While an external power source 28 is shown in the drawings, those of ordinary skill in the art will recognize that the power source can be located inside the housing 12. The screen 58 is disposed in front of the screen 14 by conventional means, such as by straps 62. Those of ordinary skill in the art will recognize, however, that the screen 58 could be press fit into the bezel 12a or be free-standing and extend upwardly from a base platform (not shown).

In another preferred embodiment of the present invention, the screen 58 passively redirects the magnetic field emanating from the screen 14 to further reduce the intensity of the magnetic field emissions from a display device. According to this embodiment of the invention, the screen 58 is isotropic with respect to magnetic permeability and has a high magnetic susceptibility. Because the screen 58 is isotropic, it will be susceptible to magnetic fields traveling in different directions. At a minimum, the screen 58 must have permeability in the direction perpendicular to the screen 14 so as to pick up the magnetic field emanating from the screen 14. Because of its high magnetic susceptibility, the screen 58 absorbs and redirects a large percentage, if not all, of the magnetic fields passing therethrough.

Preferably, the screen 58 is electrically conductive so as to reduce the strength of the magnetic field passing through it by converting the magnetic field into an electrical current running through the screen 58. Although minimal, this induced current in the screen 58 will also induce a bucking magnetic field.

Preferably, the screen 58 comprises a material that is transparent, isotropic, magnetically susceptible and electrically conductive. Such materials include synthetic yttrium iron garnets (such as $3Y_2O_3 5Fe_2O_3$) doped with a metal, preferably aluminum or gallium, to replace certain of the yttrium atoms with the metal atoms to improve transparency, $Mn_{0.5}Al_{0.5}Fe_{1.5}O_x$, iron doped glasses, thin iron based films of permalloy or like materials, ferrous fluoride ($FeF_2$), ferrous borate ($FeBO_3$), and combinations thereof. Those of ordinary skill in the art will recognize that the screen 58 may comprise many other materials that exhibit the desired characteristics. The screen 58 may also comprise ferromagnetic wires imbedded in or imprinted on transparent glass or plastic, and other combinations which are obvious to persons of ordinary skill in the art.

It is thus seen that the present invention reduces the harmful effects of magnetic radiation emitted by display devices by reducing the intensity of the emitted magnetic field. The present invention accomplishes this goal by employing either active means (sensing the magnetic field and then creating a bucking magnetic field) or passive means (disposing a magnetic screen adjacent the screen of the display device for deflecting the magnetic field), or a combination of the two.

The combined use of the active and passive approaches yields additional benefits. For instance, the screen 58 can be used as the carrier for the wire coils and can be used to passively redirect the emitted magnetic field. In addition, the use of the passive magnetic screen concentrates the emitted magnetic field, such that more of the field passes through the coils, thereby decreasing the needed sensitivity of the electronic circuitry 28. It is understood, however, that the active and passive approaches disclosed herein for reducing the magnetic field emanating from display devices may be used separately or in combination.

It should be understood that additional variations may be made to the embodiments of the invention discussed above without departing from the spirit and scope of the invention. For example, while the wire coils have been described as being disposed in front of or connected to the display device, the coils can also be formed within the enclosure, or even etched or imprinted directly onto the CRT. Further, the CRT may include one of the transparent, isotropic, magnetically susceptible and electrically conductive materials described in connection with the screen 58. Thus, the apparatus of the present invention can be retro-fit to an existing display device or can be incorporated within a display device during manufacturing.

In addition, it should be understood that although the present invention has been described in connection with magnetic field frequencies of 60 Hz and 15,000 Hz since these frequencies are encountered in the United States, the present invention is capable of reducing the intensity of magnetic field emissions at other frequencies, such as 50 Hz line current and various raster frequencies, using the principles discussed herein.

Moreover, it should be understood that the magnetic field reduction techniques described herein are equally applicable for reducing magnetic field emissions from the faces of the housing 12 other than the screen 14. Although the user of the display device 10 will normally be facing the screen 14, it is common for others to be in close proximity to the back or sides of the display device 10, therefore requiring reductions in the magnetic fields emanating therefrom.

It will also be recognized by those of ordinary skill in the art that the techniques described herein to reduce the intensity of magnetic field emissions from display devices are equally applicable to other types of devices which emit magnetic radiation. For example, electric rail cars are well suited for the employment of the active and passive techniques described herein. In electric rail cars, a strong magnetic field emanates upward through the floor of the cars from the power source in the track. These strong magnetic field emissions can be reduced by placing the sensing/bucking coils described herein in the floor of the cars. Magnetic screening material can also be built into the floors, but weight considerations will most likely cause the active coil techniques described herein to be preferred over the passive magnetic screens.

Microwave ovens are also well suited for the magnetic reduction techniques disclosed herein. Microwave ovens emit a large magnetic field, particularly through the oven door and window. These strong magnetic field emissions can be reduced by placing the sensing/bucking coils described herein in the microwave oven door. In addition, the microwave oven window may include a magnetic screening material to further reduce the emissions. Persons of ordinary skill in the art will recognize that the principles disclosed herein can be used to reduce the intensity of magnetic field emissions from other similar appliances and devices, such as jet engines and various electrical appliances.

Although various preferred embodiments of the present invention have been shown and described, a latitude of modification, change and substitution is intended in the foregoing disclosure, and in certain instances some features of the invention will be employed without a corresponding use of other features. Accordingly, it is appropriate that the appended claims be construed broadly and in a manner consistent with the scope of the invention.

What is claimed is:

1. Apparatus for reducing intensity of a magnetic field emanating from a screen of a display device, comprising:

means disposed adjacent said screen for producing a first current proportional to said magnetic field emanating from said screen;

means in electrical communication with said producing means for generating a second current responsive to said first current; and means in electrical communication with said generating means for bucking said magnetic field, wherein said producing means and said bucking means comprise a single wire coil.

2. Apparatus for reducing intensity of a magnetic field emanating from a screen of a display device, comprising:

means disposed adjacent said screen for producing a first current proportional to said magnetic field emanating from said screen;

an operational amplifier in electrical communication with said producing means and disposed to receive said first current through an output node of said amplifier for generating a second current responsive to said first current;

a compensator network disposed in a feedback loop relationship with said amplifier for adjusting said second current; and means in electrical communication with said amplifier for bucking said magnetic field.

3. Apparatus for reducing intensity of a magnetic field emanating from a screen of a display device, comprising:

means disposed adjacent said screen for producing a first current proportional to said magnetic field emanating from said screen;

an operational amplifier in electrical communication with said producing means for generating a second current responsive to said first current;

a DC voltage source in communication with said amplifier for counteracting any DC voltage induced by said producing means; and means in electrical communication with said amplifier for bucking said magnetic field.

4. Apparatus for reducing intensity of a magnetic field emanating from a screen of a display device, comprising:

means disposed adjacent said screen for producing a first current proportional to said magnetic field emanating from said screen;

a peak averaging circuit in electrical communication with said producing means for determining the amplitude of said first current;

a signal generator in communication with said peak averaging circuit for generating a second current responsive to said first current;

means in electrical communication with said generator for bucking said magnetic field; and a switch to alternately operate said generator and said bucking means.

5. Apparatus for reducing intensity of a magnetic field emanating from a screen of a display device, comprising:

means disposed adjacent said screen for producing a first current proportional to said magnetic field emanating from said screen;

means in electrical communication with said producing means for generating a second current responsive to said first current;

means in electrical communication with said generating means for bucking said magnetic field; and a transparent screen disposed adjacent said screen of said display device for receiving said producing means and said bucking means.

6. The apparatus of claim 5 wherein said transparent screen comprises an anti-glare component.

7. The apparatus of claim 5 wherein said transparent screen comprises a magnetically susceptible component.

8. The apparatus of claim 5 wherein said transparent screen comprises a material selected from the group consisting of metal doped yttrium iron garnet, iron doped glass, iron based thin films, ferrous fluoride, ferrous borate, and combinations thereof.

9. The apparatus of claim 8 wherein said material comprises aluminum doped $3Y_2O_3 5Fe_2O_3$.

10. A method for reducing intensity of a magnetic field emanating from a screen of a display device, comprising the steps of:

passing said magnetic field emanating from said screen through a sensing coil disposed adjacent said screen;

producing in said sensing coil a first current proportional to said magnetic field emanating from said screen and passing through said sensing coil;

generating a second current responsive to said first current; and passing said second current through a wire coil whereby a bucking magnetic field is produced for cancelling said magnetic field emanating from said screen, wherein said sensing coil comprises said wire coil.

11. The method of claim 10 wherein said generating step further comprises the step of passing said first current through an amplifier and compensation network.

12. The method of claim 10 wherein said wire coil is disposed on a transparent screen adjacent said screen of said display device.

13. The method of claim 12 wherein said transparent screen comprises a magnetically susceptible component.

14. The method of claim 12 wherein said transparent screen comprises a material selected from the group consisting of metal doped yttrium iron garnet, iron doped glass, iron based thin films, ferrous fluoride, ferrous borate, and combinations thereof.

15. The method of claim 12 wherein said material comprises aluminum doped $3Y_2O_3 5Fe_2O_3$.

16. An apparatus for actively reducing intensity of magnetic field emissions from a magnetic field emitting device, comprising:

means for producing a first current proportional to said magnetic field emissions;

means in electrical communication with said producing means for generating a second current responsive to said first current; and means in electrical communication with said generating means for bucking said magnetic field emissions, wherein said producing means and said bucking means comprise a single wire.

17. An apparatus for actively reducing intensity of magnetic field emissions from a magnetic field emitting device comprising:

means for producing a first current proportional to said magnetic field emissions;

an operational amplifier in electrical communication with said producing means for receiving said first current through an output node of said amplifier and for generating a second current responsive to said first current;

a compensator network disposed in a feedback loop relationship with said amplifier for adjusting said second current; and means in electrical communication with said amplifier for bucking said magnetic field emissions.

18. An apparatus for actively reducing intensity of magnetic field emissions from a magnetic field emitting device comprising:

means for producing a first current proportional to said magnetic field emissions;

an operational amplifier in electrical communication with said producing means for receiving said first current and for generating a second current responsive to said first current;

a DC voltage source in communication with said amplifier for counteracting any DC voltage induced by said producing means; and means in electrical communication with said amplifier for bucking said magnetic field emissions.

19. An apparatus for actively reducing intensity of magnetic field emissions from a magnetic field emitting device comprising:

means for producing a first current proportional to said magnetic field emissions;

a peak averaging circuit in electrical communication with said producing means for determining the amplitude of said first current;

a signal generator in communication with said peak averaging circuit for generating a second current responsive to said first current;

means in electrical communication with said generator for bucking said magnetic field emissions; and a switch to alternately operate said generator and said bucking means.

20. An apparatus for actively reducing intensity of magnetic field emissions from a magnetic field emitting device, comprising:

means for producing a first current proportional to said magnetic field emissions;

means in electrical communication with said producing means for generating a second current responsive to said first current;

means in electrical communication with said generating means for bucking said magnetic field emissions; and a transparent screen disposed adjacent said screen of said display device for receiving said producing means and said bucking means.

21. The apparatus of claim 20 wherein said transparent screen comprises an anti-glare component.

22. The apparatus of claim 20 wherein said transparent screen comprises means for passively reducing the emissions from said device.

23. The apparatus of claim 22 wherein said passive means comprises a material selected from the group consisting of metal doped yttrium iron garnet, iron doped glass, iron based thin films, ferrous fluoride, ferrous borate, and combinations thereof.

24. The apparatus of claim 23 wherein said material comprises aluminum doped $3Y_2O_3 5Fe_2O_3$.

* * * * *